United States Patent
Cope

(10) Patent No.: US 7,537,455 B2
(45) Date of Patent: May 26, 2009

(54) APPARATUS FOR TEACHING, DEMONSTRATION, OR SIMULATION, OF ORTHODONTIC TEMPORARY ANCHORAGE DEVICE PLACEMENT AND THE USE THEREOF

(75) Inventor: Jason B. Cope, Dallas, TX (US)

(73) Assignee: Under Dog Media, L.P., Dallas, TX (US)

( * ) Notice: Subject to any disclaimer, the term of this patent is extended or adjusted under 35 U.S.C. 154(b) by 381 days.

(21) Appl. No.: 11/624,236

(22) Filed: Jan. 18, 2007

(65) Prior Publication Data

US 2007/0166665 A1    Jul. 19, 2007

Related U.S. Application Data

(60) Provisional application No. 60/760,206, filed on Jan. 19, 2006.

(51) Int. Cl.
G09B 23/28 (2006.01)
(52) U.S. Cl. ....................................................... 434/263
(58) Field of Classification Search ................. 434/262, 434/263, 267, 274; 433/199.1, 229
See application file for complete search history.

(56) References Cited

U.S. PATENT DOCUMENTS

| | | | |
|---|---|---|---|
| 1,967,786 A * | 7/1934 | Schulz | 434/263 |
| 2,138,254 A * | 11/1938 | Mink | 433/56 |
| 2,256,667 A * | 9/1941 | Doret | 434/263 |
| 2,657,462 A | 11/1953 | Arrow | |
| 2,780,002 A * | 2/1957 | Shea et al. | 434/263 |
| 3,947,967 A * | 4/1976 | Satake | 434/263 |
| 4,435,163 A | 3/1984 | Schmitt et al. | |
| 4,536,158 A | 8/1985 | Bruins et al. | |
| 4,770,637 A * | 9/1988 | Harrell, Jr. | 434/263 |
| 5,030,102 A * | 7/1991 | Lang | 434/263 |
| 5,120,229 A | 6/1992 | Moore et al. | |
| 5,232,370 A * | 8/1993 | Hoye | 434/263 |
| 6,257,895 B1 * | 7/2001 | Oestreich | 434/274 |
| 6,520,775 B2 * | 2/2003 | Lee | 434/263 |
| 7,037,111 B2 * | 5/2006 | Miller | 433/213 |

* cited by examiner

*Primary Examiner*—Kurt Fernstrom
(74) *Attorney, Agent, or Firm*—Sanford E. Warren, Jr.; Akin Gump Strauss Hauer & Feld LLP

(57) ABSTRACT

A dental model comprising a first jaw member wherein the first jaw member comprises a first transparent medullary bone portion and a first opaque cortical bone portion, at least one tooth connected to the first jaw member, wherein the first jaw member further comprises a simulated gum tissue covering at least a portion of the first transparent medullary bone portion and a first opaque cortical bone portion.

20 Claims, 4 Drawing Sheets

APPARATUS FOR TEACHING, DEMONSTRATION, OR SIMULATION, OF ORTHODONTIC TEMPORARY ANCHORAGE DEVICE PLACEMENT AND THE USE THEREOF

CROSS REFERENCE TO RELATED APPLICATIONS

This application claims the benefit of U.S. Provisional Application Ser. No. 60/760,206, filed Jan. 19, 2006, entitled: APPARATUS FOR TEACHING, DEMONSTRATION, OR SIMULATION, OF ORTHODONTIC TEMPORARY ANCHORAGE DEVICE PLACEMENT AND THE USE THEREOF by inventor Jason B. Cope.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

The present invention relates to teaching or demonstration models. More specifically, the present invention relates to teaching, demonstration, and simulation models utilized in the field of orthodontic temporary anchorage devices in particular but could easily be used for other dental or medical purposes.

Anatomic dental models are used in the teaching, demonstration, and simulation of dental procedures for dental students and professionals, as well as patients. A typical dental model comprises an artificial jaw typically made of plaster or plastic with teeth mounted therein. Such dental models have been used for teaching dental procedures and surgical techniques. In the orthodontic field, a dental model can also be used for teaching and demonstration of orthodontic procedures such as brace placement and orthodontic temporary anchorage device surgical procedures.

There is a need to provide a dental model, which closely simulates the actual tactile experience and the general "feel" of an actual living patient.

In addition, there is a need to provide a dental model, which not only can be used for practicing and learning dental and/or orthodontic procedures, but one that can be used to easily examine and observe the successful or unsuccessful result of a particular procedure performed. Current dental models are absent features in combination that allow a person to see through the inner medullary bone and tissues of the upper or lower jaw to examine the result of a particular procedure performed.

BRIEF SUMMARY OF THE INVENTION

The present invention discloses a demonstration model of the human jaw comprising at least an upper or lower jaw. One of the objects of the present invention is to provide a dental model for simulating, teaching, and demonstration purposes of the human and/or veterinary oral and dental anatomical structures.

Another object of the present invention is to provide a dental model constructed of materials that simulate actual oral and dental tissues. The present invention incorporates materials that simulate each of these tissues such that the gum tissue is made of a material that looks and feels like actual gum tissue. In addition, the simulated gum tissue can be cut or incised and reflected much like a surgical flap, and can be sutured after cutting and incision.

Yet another object of the present invention is to provide a portion of a dental model that is constructed of a transparent material such that surgical procedures performed thereon can be observed and examined "post op" by viewing through a portion of the upper or lower jaw of the dental model.

DETAILED DESCRIPTION OF THE INVENTION

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

Figure 1A:
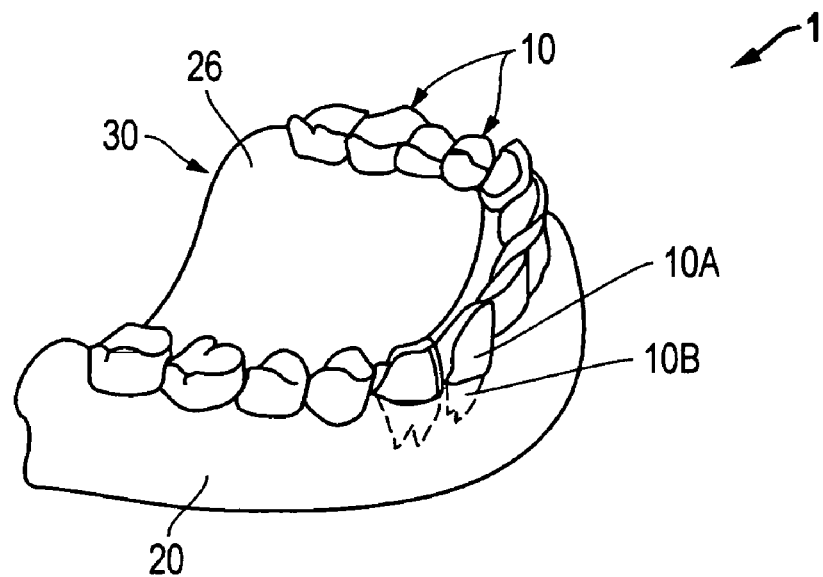
FIG. 1A is a perspective view of the dental model according to the present invention.
Figure 1B:
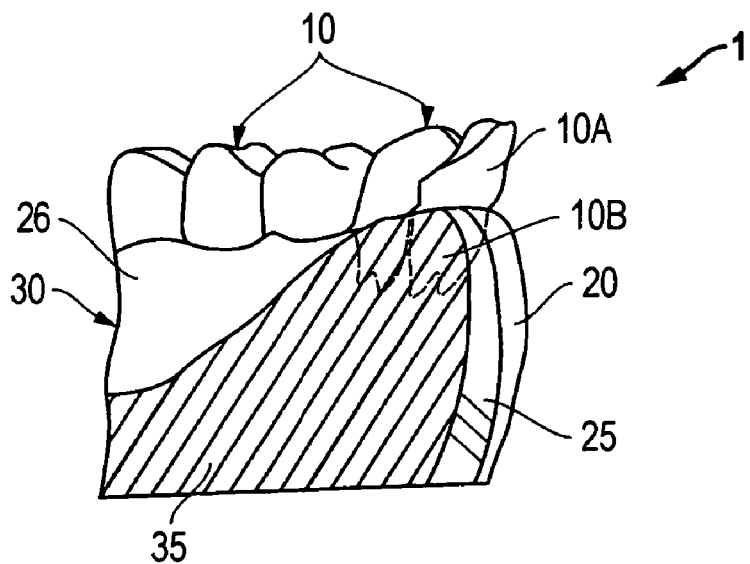
FIG. 1B is a side portion sectional view of the dental model according to the present invention.
Figure 1C:
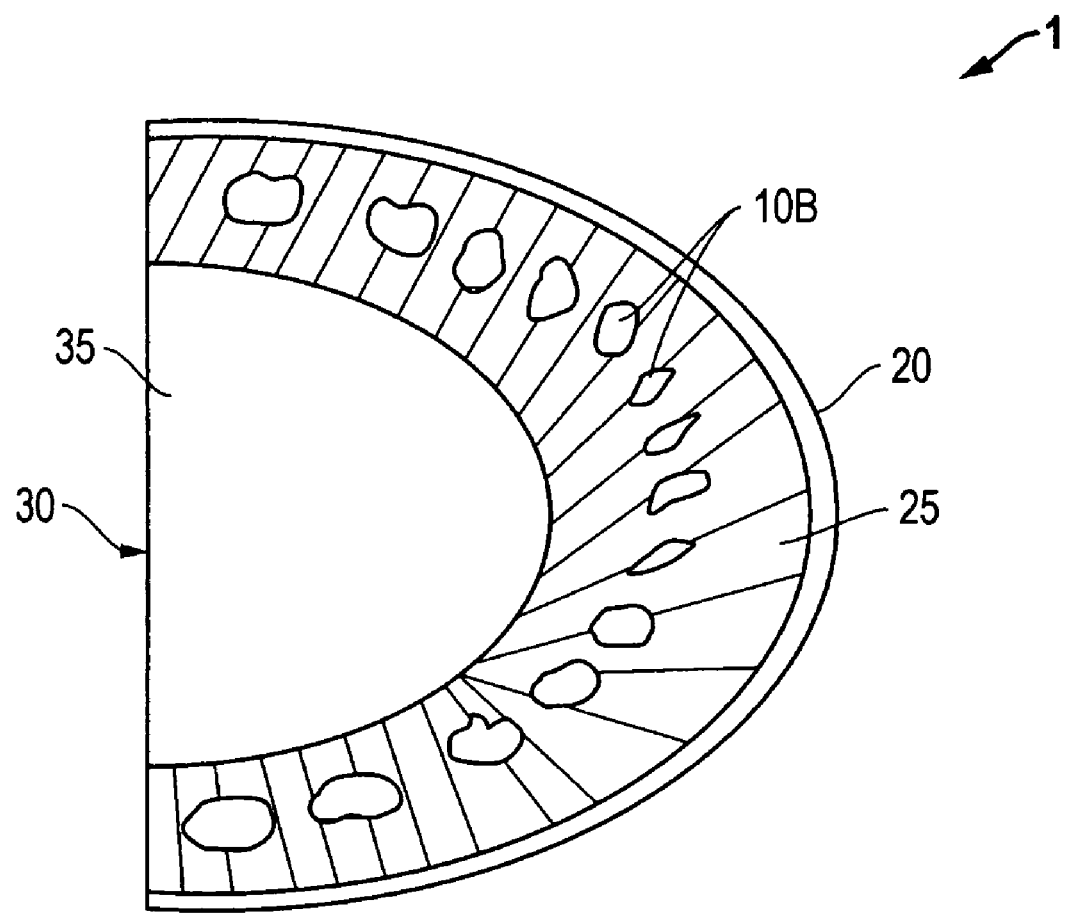
FIG. 1C is a bottom view of the dental model according to the present invention.

As shown in FIGS. 1A, 1B and 1C, the present invention can be designed and configured as an individual upper or lower jaw member 30 with gum tissue 20 and a plurality of teeth 10 as shown in FIGS. 1A, 1B, and 1C. For the sake of clarity, only the lower jaw member 30 will be described as the upper jaw member comprises the same features described in relation to the lower jaw member 30. The present invention can also optionally be designed and configured to have a flexibly hinged structure (not shown) connecting an upper jaw member and a lower jaw member 30. In this embodiment, the upper and lower jaw member 30 hinged structure is designed to simulate the actual relationship of the mammalian jaw members to each other by way of the temporomandibular joint (TMJ). A person of ordinary skill in the art will understand that the upper and lower jaw members 30 flexibly hinged structure can also be inserted into a mammalian skull model to simulate a life-like situation for performing dental and/or orthodontic procedures which include endodontic, periodontic, and oral surgery procedures. After the procedure is performed, one can remove the jaw members and examine the success or failure of the specific procedure performed on the dental model 1 by looking through the bottom of the jaw member 30.

As illustrated in FIG. 1A, a perspective view of the present invention is shown. The present invention comprises a dental model 1 simulating an upper jaw member or a lower jaw member 30, often referred to in the field as a "typodont". The present invention comprises the simulated components of the dental model 1. The dental model 1 comprises a jaw member 30 removably connected to a plurality of teeth 10 wherein each tooth 10 comprises a tooth crown 10A as shown in FIG. 1A and a tooth root 10B embedded in the jaw member 30. The dental model further comprises facial gum tissue 20 and lingual gum tissue 26. The materials used to construct the dental model 1 of the present invention simulate the structure of the human dental and oral anatomy and incorporates materials that simulate the facial gum tissue 20 and the lingual gum tissue 26 to provide a life-like look and feel of actual gum tissues (20, 26).

The look and feel of the facial gum tissue 20 and the lingual gum tissue 26 of the present invention allows one to cut or incise and reflect the tissue much like a surgical flap and further allows the tissue to be sutured after cutting or incision. In one embodiment, the material utilized to construct the facial gum tissue 20 and the lingual gum tissue 26 of the dental model 1 is made of a soft, but resilient, polymethylmethacrolate (acrylic) self-curing denture reline material. A person of ordinary skill in the art will understand, that other materials can also be used to construct the facial gum tissue 20 and the lingual gum tissue 26 to achieve a life-like look and feel as actual gum tissue that can also be cut or incised, reflected, and sutured without departing from the scope and spirit of the present invention.

Now referring to FIGS. 1B and 1C, a side portion sectional view of the dental model 1 and a bottom view, respectively, of the dental model 1 are shown. The bottom inner medullary bone portion 35 of the jaw member 30 of the dental model 1 is made of transparent materials such as, but not limited to, urethane, to enable one to see through the bottom inner portion 35 of the dental model 1 to observe the tooth root 10B, adjacent tissue components, surgical procedures, or any surgically implanted devices or materials. This novel feature of the present invention permits a person to be able to see through the tissue as dental or surgical procedures are performed as well as post-operation placement of devices.

In one embodiment, the bottom inner medullary bone portion 35 of the jaw member 30 of the dental model 1 is made of a transparent material, while an outer cortical bone portion 25 of the jaw member 30 is made of an opaque material, such as, but not limited to, urethane. The lingual gum tissue 26 and the facial gum tissue 20 are made of a pink opaque material such as, but not limited to, a self-curing denture reline material polymethylmethacrolate, such that when a dental or surgical procedure is performed on the dental model 1, the person performing the procedure will be unable to see through the tissue as would be in the case when a life-like procedure is performed on an actual patient. After the procedure is performed, one is able to examine the successful or unsuccessful results of the procedure by looking through the bottom inner medullary bone portion 35 of the jaw member 30 from the bottom of the jaw member 30. For example, in a procedure of the orthodontic temporary anchorage device(s), it is important to place the orthodontic temporary anchorage device or a miniscrew through cortical and medullary bones while avoiding the roots of the surrounding teeth. By utilizing the present invention, post operatively, one can look through the bottom inner portion 35 of the jaw member 30 of the dental model 1 to examine where the device or the miniscrew has been positioned. A person of ordinary skill in the art will understand, this "see through" feature of the present invention can also be useful for other dental or medical procedures.

Figure 2:
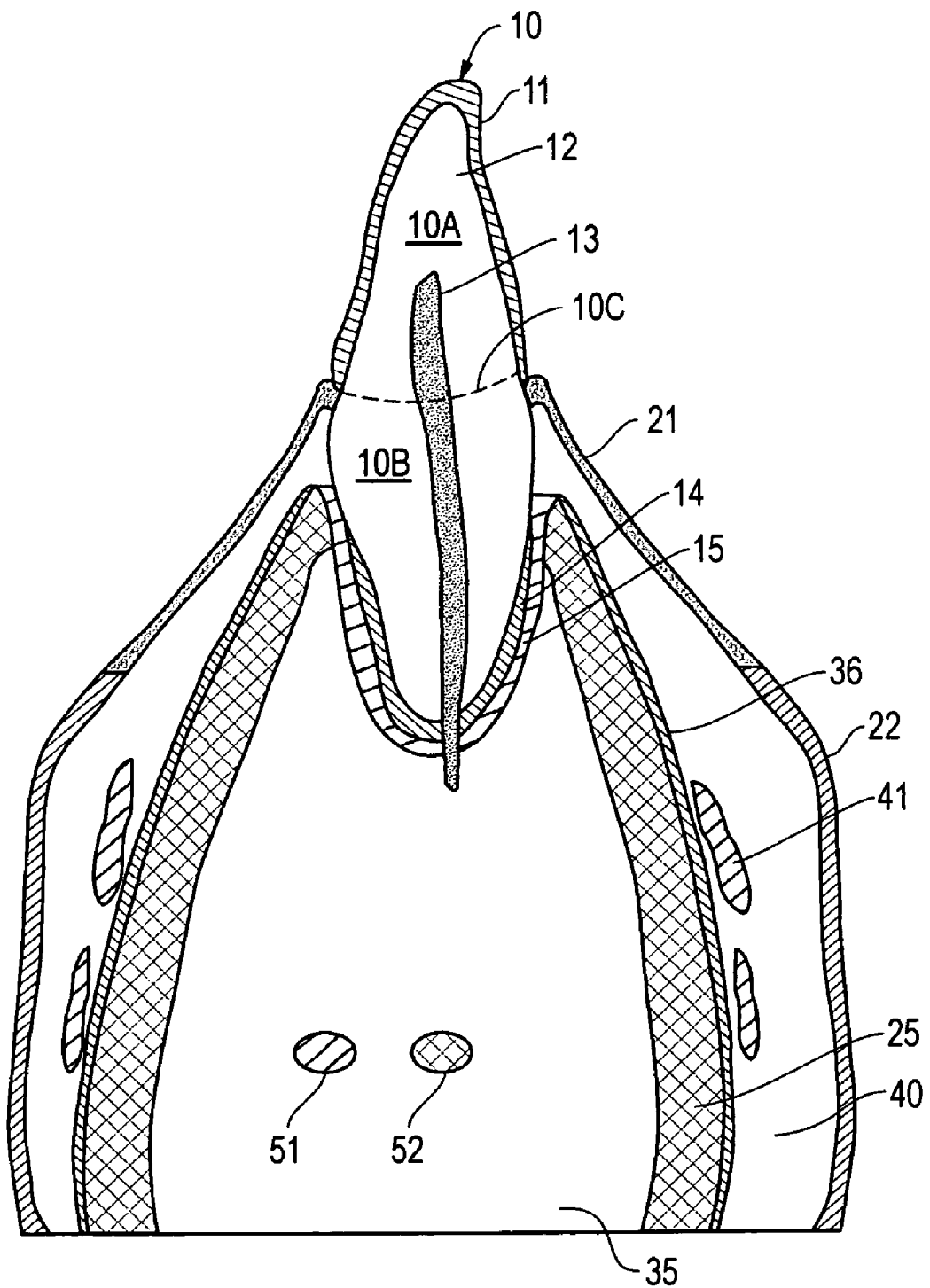
FIG. 2 is a sectional view of a tooth and the adjacent tissue components of the dental model according to the present invention.

FIG. 2 is a side sectional view of a tooth 10 and the adjacent tissue components as provided by the present invention's dental model 1. The dental model 1 is designed to simulate and replicate actual anatomical features and material properties of actual dental tissue including hardness and thickness. As shown in FIG. 2, the tooth root 10B is embedded within a simulated medullary bone 35 while simultaneously being connected to a masticatory mucosa 21, a connective tissue 40, a muscle 41, and a cortical bone 25 through attachment to a periodontal ligament 15. The tooth 10 of the present invention comprises life-like enamel 11, dentin 12, pulp 13, and cementum 14. The enamel 11 covers the exposed portion of the tooth, also known as the tooth crown 10A. The enamel 11 is made of a hard plastic such as, but not limited to, polyurethane having a hardness range between 5 GPa and 80 GPa. The thickness of the enamel 11 ranges between 0.5 mm and 3 mm, preferably between 1 mm and 2 mm, depending on the particular individual tooth. Inside of the enamel is a tissue called dentin 12.

In dental anatomy, the dentin 12 forms the bulk of the tooth and supports the enamel 11. In the present invention, the dentin 12 is made of a hard, elastic, yellowish white plastic such as, but not limited to, polyurethane with hardness ranging between 1 GPa and 20 GPa and thickness ranging between 0.5 mm and 3 mm, preferably between 1 mm and 2 mm. The central portion of the tooth 10, enclosed by the dentin 12, is filled with a soft connective tissue, blood vessels, and nerve fibers called pulp 13. The pulp 13 of the dental model 1 is also made of a soft plastic such as, but not limited to, urethane to mimic life-like pulp tissue. A hard and bone-like tissue called cementum 14 covers the root of the tooth 10. In anatomy, the cementum 14 is a mineralized connective tissue very similar to bone except that the cementum 14 is avascular. The cementum 14 of the present invention is designed and made of a plastic such as, but not limited to, polyurethane with hardness ranging between 0.5 GPa and 6 GPa and thickness ranging between 0.5 mm and 3 mm, preferably between 1 mm and 2 mm.

Also shown in FIG. 2, the tooth 10 is embedded within the medullary bone 35 through the periodontal ligament 15. The periodontal ligament 15 is a highly specialized connective tissue situated between the tooth 10 and the medullary bone 35. The periodontal ligament 15 in the present invention is made of a plastic such as, but not limited to, urethane having a thickness ranging between 0.5 mm and 1.5 mm, preferably between 0.1 mm and 1 mm. As shown in FIG. 2, the tooth 10 is stabilized within the medullary bone 35. The medullary bone 35 in the present invention is made of a softer, or less hard plastic with hardness ranging between 50 MPa and 2,500 MPa, preferably between 200 MPa and 500 MPa, and thickness ranging between 0.5 mm and 15 mm, preferably between 1 mm and 5 mm.

A cortical bone 25 covers the medullary bone 35. The cortical bone 25 in the present invention is made of a hard plastic such as, but not limited to, urethane having a hardness ranging between 0.5 GPa and 20 GPa, preferably between 16 GPa and 18 GPa, and thickness ranging between 0.5 mm and 5 mm, preferably between 1 mm and 3 mm. The cortical bone 25 and the medullary bone 35 and the adjacent tissue components are collectively called jaw member 30 as shown in FIGS. 1A and 1B.

Also shown in FIG. 2, a paper-thin layer of tissue called periosteum 36 lies between the cortical bone 25 and the connective tissue 40. The periosteum 36 is made of an elastic material such as, but not limited to, an aromatic polyether film which can be cut and reflected. Covering the root of the tooth 10 and the cortical bone 25 is called oral mucosa. In FIG. 2, the superior portion of the mucosa, located near the neck 10C of the tooth 10, is called masticatory mucosa 21 and the inferior portion of the mucosa, well below the neck 10C of the tooth 10, is called alveolar mucosa 22 located underneath the masticatory mucosa 21 and the alveolar mucosa 22 is connective tissue 40 connecting the mucosa and the root 10B of the tooth 10 or the periosteum 36. The alveolar mucosa 22, the masticatory mucosa 21 and the connective tissue 40 are collectively called gum tissue 20 as shown in FIGS. 1A and 1B. As discussed before, the alveolar mucosa 22, the masticatory mucosa 21 and the connective tissue 40 can be made of a material or a plurality of materials which can be cut and incised much like life-like tissues. In one embodiment, the mucosa (21, 22) and the connective tissue 40 are made of a soft but resilient polymethylmethacrolate (acrylic), self-curing denture reline material. The gum tissue 20, which includes the alveolar mucosa 22, the masticatory mucosa 21, and the connective tissue 40, ranges between 0.5 mm and 6 mm, preferably between 1 mm and 4 mm.

In one embodiment of the present invention, as shown in FIG. 2, a blood vessel 51 and a nerve 52 are designed to be located within the medullary bone 35. The blood vessel 51 and the nerve 52 can be configured to simulate the actual anatomical relationship with the medullary bone 35 and other surrounding tissues.

Figure 2A:
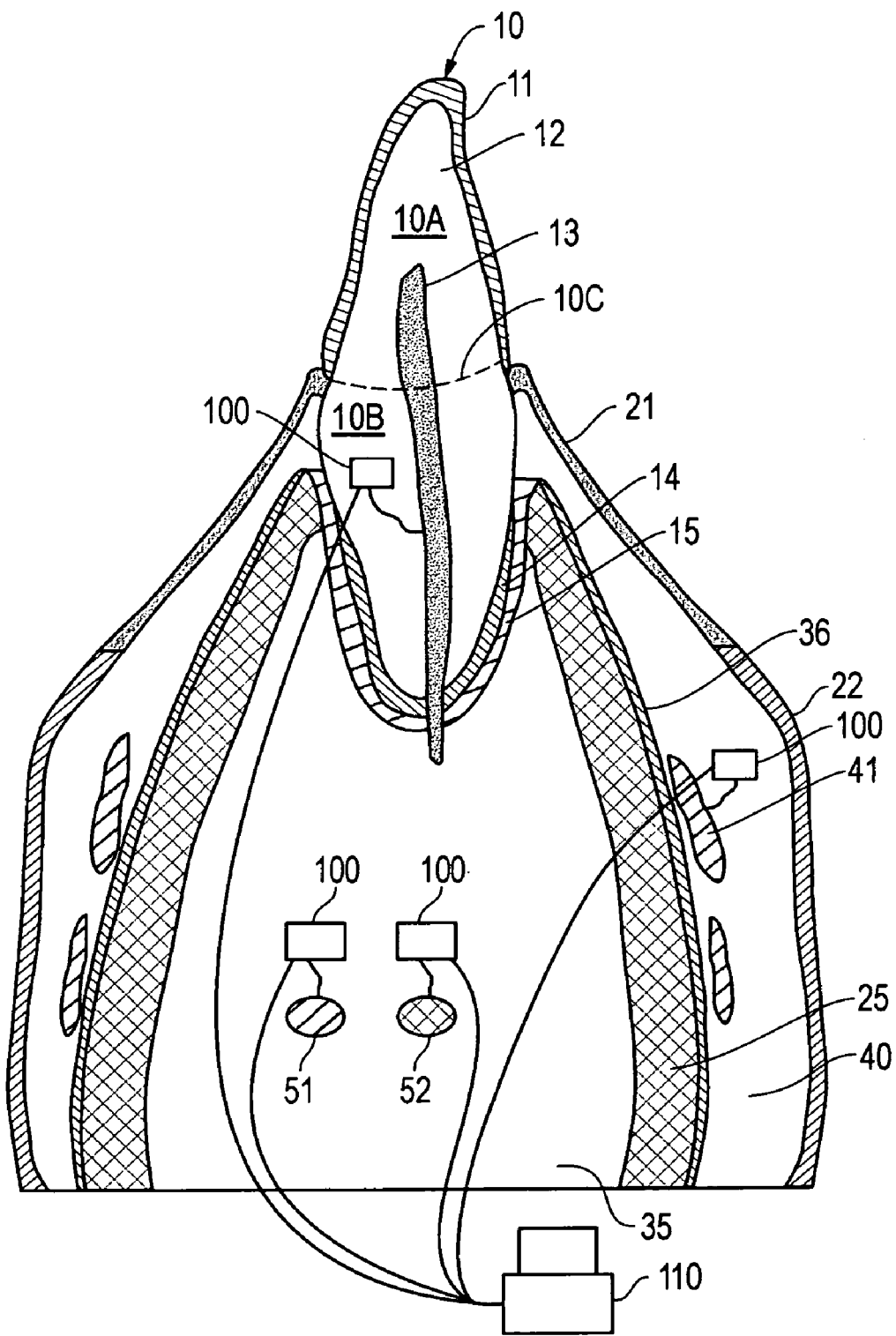
FIG. 2A is sectional view of the tooth and the adjacent tissue components of the dental model and comprising at least one sensor in communication therewith a computer according to an alternate embodiment of the present invention.

In another embodiment, as shown in FIG. 2A, at least one electronic sensor 100 can be incorporated or associated individually or in combination with the blood vessel 51, the nerve 52, the muscle 41 or the tooth root 10B. By way of proper electrical wiring and connection with a computer system 110, one can utilize this feature to monitor whether the blood vessel 51, the nerve 52, the muscle 41 or the tooth root 10B is touched or contacted by an instrument or device during a demonstration or practice surgical procedure.

A person of ordinary skill in the art will understand that additional materials other than the plastics disclosed herein can be used to achieve the desired hardness, thickness, and life-like appearance of each tissue designed and configured in the present invention.

In another embodiment of designing and constructing of the dental model of the present invention, the prototype of the dental model can be made in wax, and then each tissue is cut back and molds or dies are made at each stage according to the specifications in dental anatomy. Furthermore, the entire process of making the prototype of the dental model can be reversed to make the functional product according to each specification on each part of the dental model. In another embodiment, the dental model of the present invention can be designed and constructed digitally with aid of computer technology, specifically with Computerized Tomography (CT) scanners or 3-D Cone Beam Computerized Tomography (CT) scanners in conjunction with 3-D modeling technology.

A person of ordinary skill in the art will understand, this process of designing and making a teaching model can be applied for the design and construction of other anatomical models for other human and/or veterinary tissues or organs.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended Claims.

It is therefore, contemplated that the following Claims will cover any such modifications or embodiments that fall within the true scope of the invention.

What is claimed:

1. A dental model comprising:
   a first jaw member wherein the first jaw member comprises a first transparent medullary bone portion and a first opaque cortical bone portion,
   at least one tooth connected to the first jaw member, and
   wherein the first jaw member further comprises a simulated gum tissue covering at least a portion of the first transparent medullary bone portion and a first opaque cortical bone portion.

2. The dental model of claim 1, wherein the at least one tooth is removably connected to the first jaw member.

3. The dental model of claim 1, wherein the at least one tooth comprises a dentin portion enclosing a pulp portion and wherein the dentin portion is comprised of a hard plastic material and the pulp portion is comprised of a soft plastic material.

4. The dental model of claim 3, wherein the hard plastic material of the dentin portion comprises polyurethane and the soft plastic material of the pulp portion comprises urethane.

5. The dental model of claim 1, wherein the first transparent medullary bone portion is comprised of a soft plastic, having a hardness of 50 MPa to 2500 MPa and a thickness of 0.5 mm to 15 mm, and wherein the first opaque cortical bone portion is comprised of a plastic having a hardness between 0.5 GPa and 20 GPa and a thickness of 0.5 mm to 5 mm.

6. The dental model of claim 1, wherein the first transparent medullary bone portion and the first opaque cortical bone portion are constructed of urethane.

7. The dental model of claim 1, wherein the at least one tooth defines a tooth crown portion and a tooth root portion.

8. The dental model of claim 7, wherein the tooth root portion of the at least one tooth removably connected to the first jaw member is embedded within the first jaw member when connected to the first jaw member.

9. The dental model of claim 8, wherein the tooth root portion of the at least one tooth is embedded within the medullary bone portion of the first jaw member and while simultaneously being connected to a masticatory mucosa, a connective tissue, a muscle, and a cortical bone through attachment to a periodontal ligament.

10. The dental model of claim 1, wherein the simulated gum tissue extends to contact the at least one tooth when the at least one tooth is connected with the first jaw member.

11. The dental model of claim 1, wherein the simulated gum tissue is constructed of an opaque material.

12. The dental model of claim 11, wherein the opaque material of the simulated gum tissue is resilient polymethylmethacrolate, self-curing denture reline material.

13. The dental model of claim 1 further comprising:
   at least one additional anatomical structure selected from the group consisting of a simulated blood vessel located within the medullary bone portion of the first jaw member;

a simulated nerve located within the medullary bone portion of the first jaw member;

and a simulated muscle located within the simulated gum tissue of the first jaw member.

14. The dental model of claim 13 further comprising:

at least one electronic sensor incorporated with the at least one additional anatomical structure or the tooth root defined by the at least one tooth.

15. A removable jaw member structure to simulate a lifelike situation for performing dental and/or orthodontic procedures which include endodontic, periodontic, and oral surgery procedures, comprising:

an upper jaw member defined by an upper transparent medullary bone portion and an upper opaque cortical bone portion and, a lower jaw member defined by a lower transparent medullary bone portion and a lower opaque cortical bone portion and, at least one tooth removably connected to the upper jaw member and/or the lower jaw member, and wherein the upper jaw member and the lower jaw member are disposed in a flexibly hinged relationship, wherein the structure formed can be used independent to, or in an inserted relationship with, a mammalian skull model or the like, thereby forming a structure that can be removably inserted into a mammalian skull model or the like.

16. A method for using an improved dental apparatus, having a transparent medullary bone portion, an opaque cortical bone portion and a simulated gum tissue covering at least a portion of the transparent medullary bone portion and the opaque cortical bone portion, comprising the steps of:

performing a simulated operation on the improved dental apparatus; and observing results of the simulated operation performed on the improved dental apparatus by viewing the results through the transparent medullary bone portion.

17. The method of claim 16, wherein performing the simulated operation comprises the step of incising the simulated gum tissue of the improved dental apparatus.

18. The method of claim 17, wherein performing the simulated operation further comprises the step of reflecting the simulated gum tissue after incising the simulated gum tissue of the improved dental apparatus.

19. The method of claim 17, wherein the performing the simulated operation further comprises the step of suturing the simulated gum tissue of the improved dental apparatus after incising the simulated gum tissue of the improved dental apparatus.

20. The method of claim 16, further comprising the step of:

monitoring an electronic meter wherein the meter provides immediate indication as to whether at least one electronic sensor disposed within the improved dental apparatus is contacted.

* * * * *